(12) United States Patent
Trimberger

(10) Patent No.: US 9,225,512 B1
(45) Date of Patent: Dec. 29, 2015

(54) ENCRYPTION AND DECRYPTION USING A PHYSICALLY UNCLONABLE FUNCTION

(71) Applicant: Xilinx, Inc., San Jose, CA (US)

(72) Inventor: Stephen M. Trimberger, Incline Village, NV (US)

(73) Assignee: XILINX, INC., San Jose, CA (US)

( * ) Notice: Subject to any disclaimer, the term of this patent is extended or adjusted under 35 U.S.C. 154(b) by 72 days.

(21) Appl. No.: 13/875,156

(22) Filed: May 1, 2013

(51) Int. Cl.
*H04L 9/24* (2006.01)
*H04L 9/08* (2006.01)

(52) U.S. Cl.
CPC ....................................... *H04L 9/08* (2013.01)

(58) Field of Classification Search
CPC ....... H04L 9/08; H04L 9/0861; H04L 9/0822; H04L 9/0643; G06F 21/72; G06F 21/60; G06F 21/70; G06F 21/64
See application file for complete search history.

(56) References Cited

U.S. PATENT DOCUMENTS

| 2011/0191837 | A1* | 8/2011 | Guajardo Merchan et al. .. 726/6 |
| 2014/0093074 | A1* | 4/2014 | Gotze et al. ..................... 380/45 |
| 2014/0201540 | A1* | 7/2014 | Li et al. ......................... 713/193 |

OTHER PUBLICATIONS

U.S. Appl. No. 13/867,429, filed Apr. 22, 2013, Trimberger et al.
U.S. Appl. No. 13/867,456, filed Apr. 22, 2013, Trimberger.
U.S. Appl. No. 13/867,574, filed Apr. 22, 2013, Trimberger et al.

* cited by examiner

*Primary Examiner* — Izunna Okeke
(74) *Attorney, Agent, or Firm* — LeRoy D. Maunu

(57) ABSTRACT

Approaches for using a physically unclonable function (PUF) as a key-encrypting key are disclosed. Data is encrypted using a session key, and at least one PUF value is generated from a PUF. The session key and a correctness indicator are encrypted into a corresponding session key pair using the PUF value. Each session key pair is added to the encrypted data. Subsequent decryption, using a subsequently generated PUF value, of the correctness indicator to an expected value indicates a valid decryption. Decryption may be repeated using a different PUF value if the correctness indicator does not match the expected value. In another approach, the session key may be omitted and the payload data may be encrypted with the different PUF values and paired with correctness indicators.

15 Claims, 4 Drawing Sheets

ENCRYPTION AND DECRYPTION USING A PHYSICALLY UNCLONABLE FUNCTION

TECHNICAL FIELD

The disclosure generally relates to use of a physically unclonable function for encryption and decryption.

BACKGROUND

A system's identity may be established and authenticated based on the unique physical properties of the system. In some applications, physically unclonable functions (PUFs) embodied in integrated circuits are used to exploit the unique physical characteristics of a system for purposes of authentication. Each instance of the IC will have slightly different physical characteristics due to the random variation in an IC fabrication process. A PUF circuit uses the physical characteristics to generate an identifier value, for example a binary number, which differs from one integrated circuit to the next due to the different physical characteristics of each manufactured device. These identifier values may be used to uniquely identify the integrated circuit, as a key for encryption and decryption, or for other purposes. Examples of circuits used to implement PUFs include delay circuits and ring oscillators, memory circuits, and cross-coupled latches. The terms PUF circuit and PUF may be used interchangeably herein.

PUFs may operate according to a challenge-response protocol. The input to a PUF is the challenge, and the output from the PUF is the response. The slight variations between instances of the PUF circuits in different systems result in the separate instances providing different responses to the same challenge. In addition to identification and authentication, PUF circuits may be used to generate volatile secret keys.

Helper data is sometimes used to compensate for instability in a PUF circuit. Since a PUF circuit relies on a physical property of a device, the PUF values may not be consistent as the device and PUF age. Since a changed PUF value may prevent authentication of a device or communication with a device, helper data in the form of an error-correcting code may be used to correct generated PUF values to the expected PUF value. While the helper data is useful in maintaining the viability of the PUF over the life of the device, the helper data may also reveal information about the PUF value. In addition, the helper data may be large and may create storage issues.

SUMMARY

In one approach, a method is provided for using a physically unclonable function (PUF) for encryption of a key, an identifier, or other sensitive data. Data is encrypted using a session key, and at least one PUF value is generated from a PUF. The session key and a correctness indicator are encrypted into a corresponding session key pair using the PUF value. Each session key pair is added to the encrypted data.

A method of using a physically unclonable function (PUF) for decryption is provided in another approach. The method includes generating a first PUF value from a PUF. For one or more data pairs in an input data set that includes a plurality of data pairs, each data pair including an encrypted first data part and an encrypted second data part, the method performs operations including decrypting the data pair into a decrypted first data part and a decrypted second data part using the first PUF value as a decryption key. In response to the decrypted second data part being not equal to a correctness indicator another PUF value is generated and the data pair is decrypted using the other PUF value as the decryption key. In response to the decrypted second data part being equal to the correctness indicator the decrypted first data part is output.

A decryption system is provided in another approach. The system includes at least one physically unclonable function (PUF). The PUF is configured to output a PUF value in response to an input challenge. A decryption circuit is configured to decrypt input data with an input decryption key, and a control circuit is coupled to the PUF and to the decryption circuit. The control circuit is configured to input a data set that includes a plurality of data pairs. Each data pair includes an encrypted first data part and an encrypted second data part. For one or more of the input data pairs, the control circuit provides one or more challenges to the PUF and receives one or more corresponding PUF values. The control circuit provides the one or more PUF values and the one or more input data pairs to the decryption circuit for decrypting the one or more input data pairs. The control circuit determines whether or not a decrypted first data part is correct based on a decrypted second data part of one or more decrypted ones of the input data pairs. In response to determining that the decrypted first data part is not correct, one or more different ones of the one or more PUF values and the one or more input data pairs are provided to the decryption circuit for decrypting the one or more input data pairs. In response to determining the decrypted first data part to be correct, the decrypted first data part is output.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings, in which.

DETAILED DESCRIPTION

Approaches are described for eliminating the use of error-correcting codes with PUFs for encrypting and decrypting encryption keys. Rather than correcting a generated PUF value to an expected PUF value using an error-correcting code, one or more PUF values are generated and used to encrypt an encryption key and a correctness indicator. The encrypted encryption key and encrypted correctness indicator are referred to as a session key pair. The encryption key (or session key) is used to encrypt payload data, and the encrypted encryption key and encrypted correctness indicator are combined (e.g., appended or prepended) with the encrypted data. The one or more PUF values are selected from the responses generated by one or more PUFs and may be the most frequently occurring PUF values. By selecting the most frequently occurring PUF value(s) to encrypt the encryption key and correctness indicator, one of possibly multiple PUF values generated during decryption is likely to match the PUF value(s) used for encryption. The validity of the decryption is indicated by the decrypted correctness indicator matching an expected value.

In another implementation, the session key may be omitted and the payload data may be encrypted with the different PUF values and paired with correctness indicators.

During decryption, different PUF values may be generated and used to decrypt one or more encrypted data pairs. In one implementation, each encrypted data pair includes an encrypted session key and a corresponding encrypted correctness indicator. In another implementation, each encrypted data pair includes encrypted payload data and a corresponding encrypted correctness indicator. If for a PUF value, the decrypted correctness indicator matches an expected correctness value, the decryption is valid. If the decrypted correctness indicator does not match the expected correctness value for the PUF value, another PUF value is generated and the encrypted data pair is decrypted with the new PUF value. The decrypting with a different PUF value is repeated until there is a correct decryption or there are no more different PUF values to attempt. If the encrypted data pair did not decrypt correctly with any of the attempted PUF values, and if there is another encrypted data pair, the different PUF values may be used to decrypt the other encrypted data pair. The process may be repeated until there is a correct decryption or there are no more encrypted data pairs to process.

Figure 1:
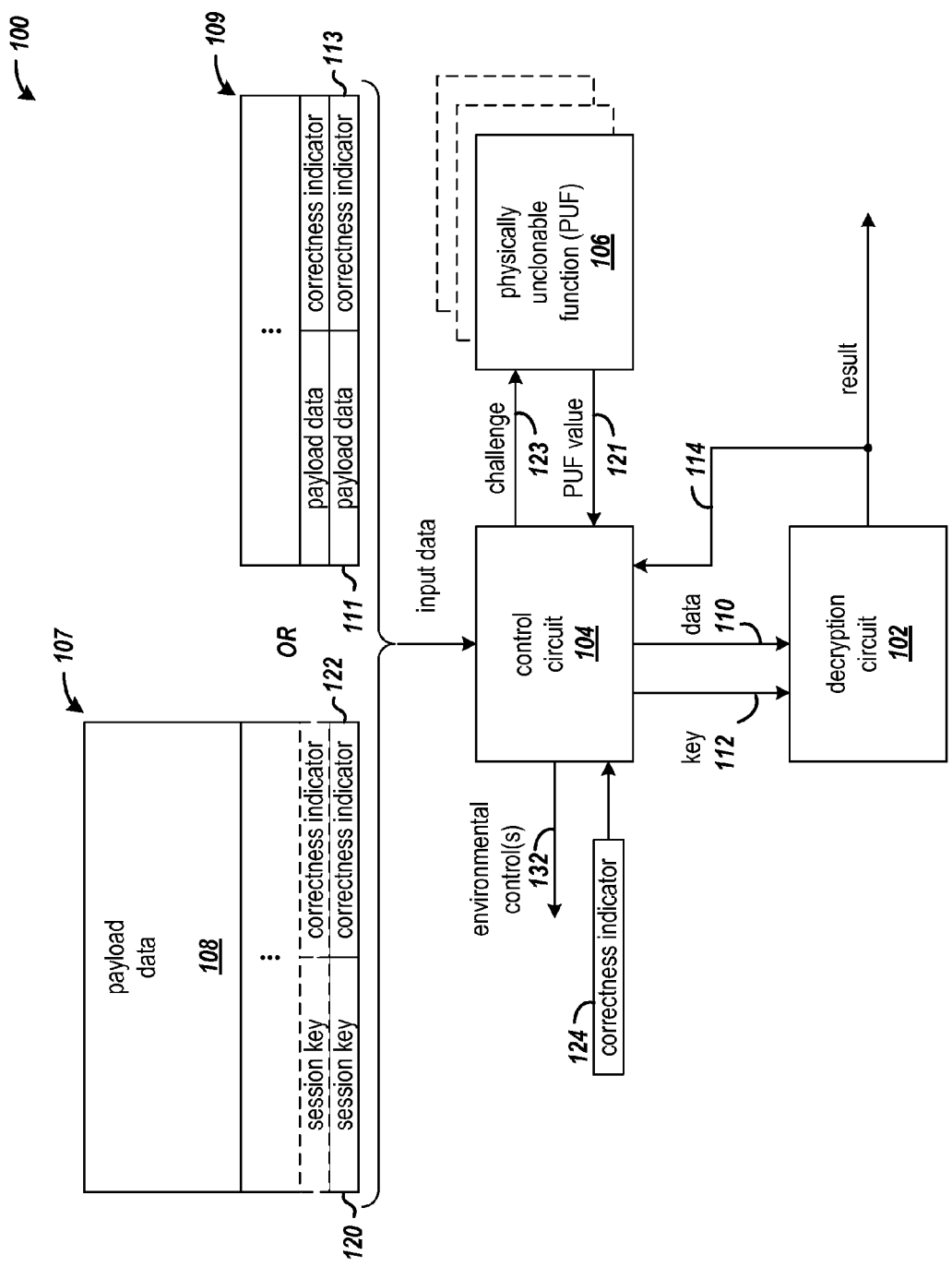
FIG. 1 shows an example decryption system.

FIG. 1 shows an example decryption system. The decryption system 100 includes a decryption circuit 102, a control circuit 104, and at least one PUF 106. An input data set is input to the control circuit 104. The input data set includes one or more encrypted data pairs. In one implementation, the input data set 107 also includes encrypted payload data 108, and the encrypted data pairs are session key pairs. Each session key pair includes a session key 120 and a corresponding correctness indicator 122. In another implementation, which may be suitable for smaller size payloads, the input data set 109 includes multiple encrypted data pairs, and each encrypted data pair includes encrypted payload data 111 and a corresponding encrypted correctness indicator 113.

The decryption circuit decrypts input data 110 with an input decryption key 112, and outputs the decrypted result data 114. Each of the PUFs 106 outputs a PUF value 121 in response to an input challenge 123. The control circuit 104 is coupled to the PUF 106 and to the decryption circuit 102 and inputs each encrypted data pair to the decryption circuit.

The control circuit controls the generating of PUF values and decrypting of the session key pairs (or encrypted data pairs) in order to determine the correct decryption. The control circuit provides a challenge to a PUF and receives a PUF value in response. The PUF value and an encrypted data pair are provided by the control circuit as the key 112 and data 110 inputs to the decryption circuit 102. The control circuit compares the decrypted result from the decryption circuit to an expected correctness indicator 124. The expected correctness indicator may be computed or a stored value.

In response to the decrypted correctness indicator matching the expected correctness indicator, the control circuit provides the decrypted session key as the key input and the encrypted payload data 108 as the data input to the decryption circuit. In an implementation in which the payload data and correctness indicator are provided as a pair to the decryption circuit along with the PUF value, in response to a correct decryption the decrypted payload may be provided as output with no further decryption being needed. For a correct decryption, the control circuit may output a signal (not shown) indicating that the decrypted result from the decryption circuit is correct.

In response to the decrypted correctness indicator not matching the expected correctness indicator, the control circuit may either initiate another decryption of the same encrypted data pair with a different PUF value, or if all available PUF values have been attempted in decrypting the pair and there is another pair in the input data set, initiate decryption of the other pair with one or more PUF values.

Depending on design requirements, the decryption system may include one or multiple PUFs 106. In a one-PUF implementation, the control circuit may use environmental controls 132 to influence the behavior of the PUF. By influencing the behavior of the PUF, the same challenge presented to the PUF may result in the PUF outputting different PUF values. Example environmental controls include varying the supply voltage level to the PUF or controlling circuitry whose on/off state or speed of operation would vary the operating temperature of the PUF. Such circuitry may be dedicated for such purpose. To enable correct decryption, the encrypting of the data pair may also vary environmental conditions of the PUF and select one or more of the most frequently occurring PUF values for use in encrypting a data pair. When varying the environmental conditions, some PUF values may be more common over all aging assumptions and the most frequently occurring PUF value(s) may be selected.

A multi-PUF implementation may be employed as an alternative to or in addition to varying environmental conditions of a PUF. The control circuit may issue challenges to multiple different PUFs and use the responses to initiate decryption of an encrypted data pair. The control circuit attempts decryption using the possible combinations of challenge and PUF until an encrypted data pair is successfully decrypted. The PUFs 106 may include one or more ring oscillator-based PUFs and/or one or more memory-based PUFs, for example.

Figure 2:
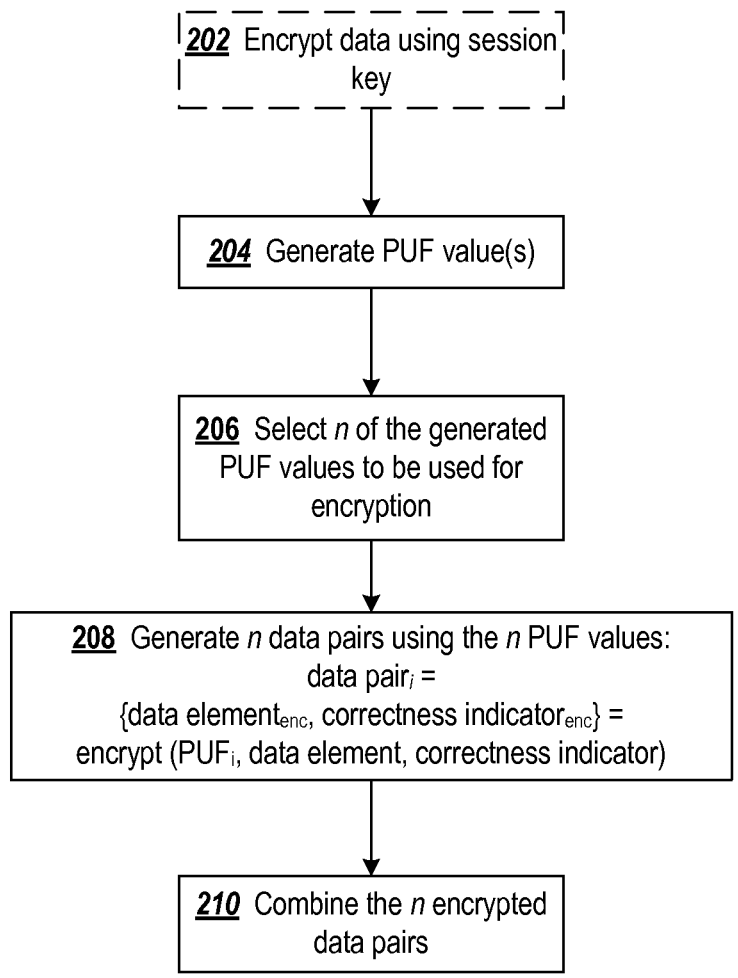
FIG. 2 shows an example process of using a PUF for encryption.

FIG. 2 shows an example process of using a PUF for encryption. At block 202, payload data may be encrypted using a session key. As indicated above, use of a session key is optional for some implementations. In an implementation in which a session key is not used to encrypt payload data, and the payload data is encrypted using PUF values, the processing of block 202 is unnecessary.

One or more PUF values are generated at block 204, and at block 206, n of the generated PUF values are selected for use. Depending on design objectives, one or more of the PUF value(s) may be selected. At block 208, n encrypted data pairs are generated using the n PUF values. In one implementation, each encrypted data pair is produced by encrypting the session key and a correctness indicator using one of the PUF values as the encryption key. The correctness indicator serves to signal when decryption is successful or valid. The correctness indicator can be any known value and does not need to be kept secret. Values such as a hash or cyclic redundancy check (CRC) of the session key may alternatively be used. In another implementation, each encrypted data pair is produced by encrypting the payload data and a correctness indicator using one of the PUF values as the encryption key.

At block 210, the one or more encrypted data pairs are then combined into an input data set that can be decrypted by using the same PUF(s). In an implementation using session keys, for example, each encrypted session key pair may be either appended or prepended to the encrypted payload data.

In one approach, the generating of the PUF values is performed under different environmental conditions. That is, the environmental conditions under which one PUF value is generated are different from the environmental conditions under which one or more others of the plurality of PUF values are generated. The different environmental conditions may include, for example, different supply voltage levels provided to the PUF, operating the PUF at different temperatures, or a combination thereof. Operating the PUF at different temperatures refers to the temperature of the PUF itself, and the temperature may be varied by turning-on and turning-off or varying the speed of circuitry proximate the PUF. Such circuitry may be dedicated to controlling the temperature.

In one implementation, environmental conditions are not varied and only one PUF value is generated and used to encrypt the data pair. In this implementation, the PUF value may also serve as the session key with which the payload data is encrypted. On the decryption side, multiple PUF values may be generated with a variety of environmental conditions to determine which PUF value properly decrypts the session key pair.

As an alternative to varying the environmental conditions, or in combination therewith, multiple PUF values may be generated by inputting different challenges to a PUF or by using multiple PUFs to generate different PUF values.

In one approach to selecting the n of the generated PUF values, one or more of the PUF values that occur most frequently in the generated set of PUF values are selected. Limiting the number of PUF values used to encrypt session key pairs reduces the amount of storage required. However, fewer encrypted data pairs increases the chances that decryption will fail. Limiting the number of PUF values selected for use in encryption may be used to limit the lifetime of the device having the PUF. For example, if one or more PUF values are known to occur after some period of device operation, those PUF values may be excluded from the PUF values selected. When the device reaches an age at which the PUF generates one of the excluded PUF values, decryption of the encrypted data pairs will fail since none of the data pairs was encrypted with the excluded PUF value.

Figure 3:
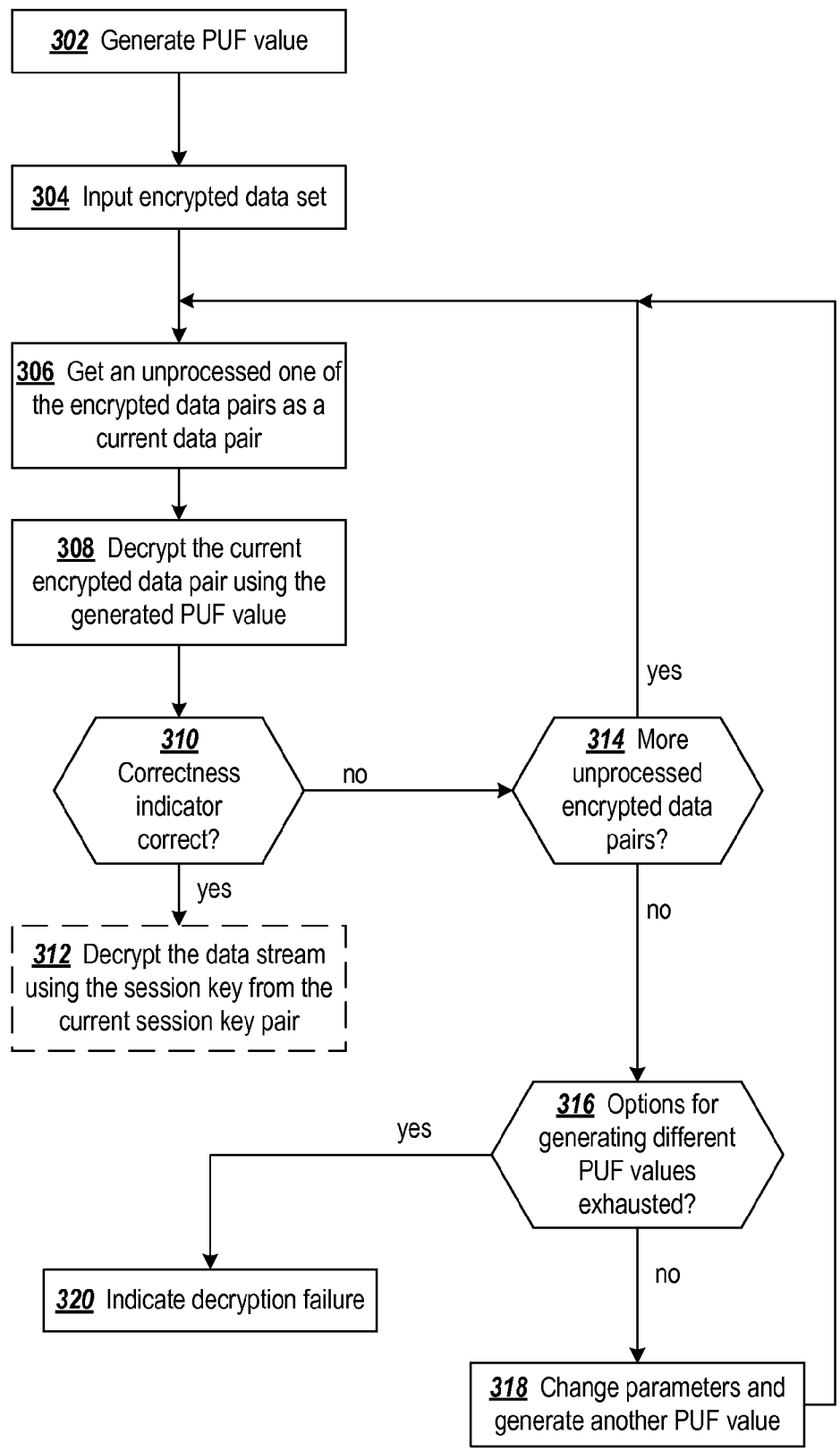
FIG. 3 shows an example process of using a PUF for decryption.

FIG. 3 shows an example process of using a PUF for decryption. At block 302, a PUF value is generated, and at block 304 an encrypted data set is input. An unprocessed one of the encrypted data pairs is obtained for processing at block 306. At block 308, the current encrypted data pair is decrypted into a decrypted data element (i.e., decrypted payload data or decrypted session key) and a decrypted correctness indicator using the generated PUF value.

In response to the decrypted correctness indicator being correct (matching an expected value), decision block 310 directs the process to block 312 where the encrypted payload data is decrypted using the decrypted session key. It will be recognized that for an implementation in which each encrypted data pair includes encrypted payload data and an encrypted correctness indicator, the decrypted data element will be the decrypted payload data, and the decryption of block 312 is unnecessary. In response to the decrypted correctness indicator being incorrect, the process is directed to decision block 314 to check if there are more unprocessed encrypted data pairs. If there is another unprocessed encrypted data pair, the process returns to block 306.

If all the encrypted data pairs have been decrypted with the current PUF value, the process continues at decision block 316. Decision block 316 determines whether or not all options have been exhausted for generating different PUF values. For example, depending on the implementation, environmental conditions may be varied for a PUF, different challenges may be input to a PUF, and/or challenges may be input to different PUFs for generating different PUF values. If all options have been exhausted, the process is directed to block 320 where a decryption failure is indicated. Otherwise, if there remains an untried option for generating a PUF value, the process is directed to block 318 where parameters are adjusted and another PUF value is generated based on the adjusted parameters. The options for adjusting parameters may include varying environmental conditions, changing a challenge, and/or submitting a challenge to a different PUF as discussed above. Examples of the environmental conditions include the supply voltage level to the PUF and the operating temperature of the PUF. The process then continues at block 306 with the new PUF value.

Figure 4:
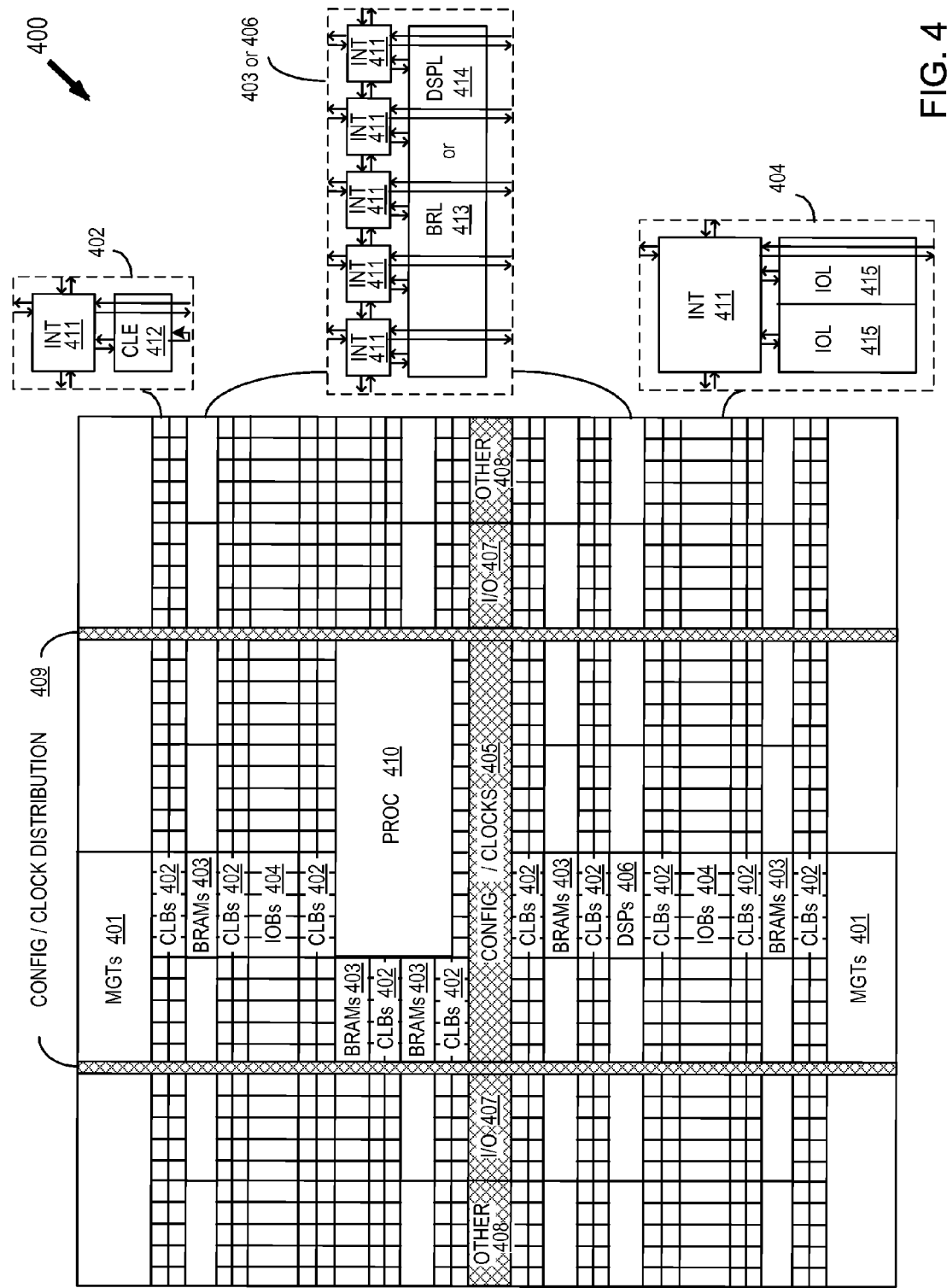
FIG. 4 shows an example programmable logic IC on which the encryption and decryption circuitry may be implemented.

FIG. 4 shows an example programmable logic IC on which the encryption and decryption circuitry may be implemented. A decryption system, as previously described, may be implemented on the programmable logic and interconnect resources of programmable integrated circuit.

FPGAs can include several different types of programmable logic blocks in the array. For example, FIG. 4 illustrates an FPGA architecture (400) that includes a large number of different programmable tiles including multi-gigabit transceivers (MGTs 401), configurable logic blocks (CLBs 402), random access memory blocks (BRAMs 403), input/output blocks (IOBs 404), configuration and clocking logic (CONFIG/CLOCKS 405), digital signal processing blocks (DSPs 406), specialized input/output blocks (I/O 407), for example, e.g., clock ports, and other programmable logic 408 such as digital clock managers, analog-to-digital converters, system monitoring logic, and so forth. Some FPGAs also include dedicated processor blocks (PROC 410) and internal and external reconfiguration ports (not shown).

In some FPGAs, each programmable tile includes a programmable interconnect element (INT 411) having standardized connections to and from a corresponding interconnect element in each adjacent tile. Therefore, the programmable interconnect elements taken together implement the programmable interconnect structure for the illustrated FPGA. The programmable interconnect element INT 411 also includes the connections to and from the programmable logic element within the same tile, as shown by the examples included at the top of FIG. 4.

For example, a CLB 402 can include a configurable logic element CLE 412 that can be programmed to implement user logic plus a single programmable interconnect element INT 411. A BRAM 403 can include a BRAM logic element (BRL 413) in addition to one or more programmable interconnect elements. Typically, the number of interconnect elements included in a tile depends on the width of the tile. In the pictured FPGA, a BRAM tile has the same width as five CLBs, but other numbers (e.g., four) can also be used. A DSP tile 406 can include a DSP logic element (DSPL 414) in addition to an appropriate number of programmable interconnect elements. An IOB 404 can include, for example, two instances of an input/output logic element (IOL 415) in addition to one instance of the programmable interconnect element INT 411. As will be clear to those of skill in the art, the actual I/O pads connected, for example, to the I/O logic element 415 are manufactured using metal layered above the various illustrated logic blocks, and typically are not confined to the area of the input/output logic element 415.

In the pictured FPGA, a horizontal area near the center of the die (shown shaded in FIG. 4) is used for configuration, clock, and other control logic. Vertical areas 409 extending from this horizontal area are used to distribute the clocks and configuration signals across the breadth of the FPGA.

Some FPGAs utilizing the architecture illustrated in FIG. 4 include additional logic blocks that disrupt the regular row structure making up a large part of the FPGA. The additional logic blocks can be programmable blocks and/or dedicated logic. For example, the processor block PROC 410 shown in FIG. 4 spans several rows of CLBs and BRAMs.

Note that FIG. 4 is intended to illustrate only an exemplary FPGA architecture. The numbers of logic blocks in a row, the relative heights of the rows, the number and order of rows, the types of logic blocks included in the rows, the relative sizes of the logic blocks, and the interconnect/logic implementations included at the top of FIG. 4 are purely exemplary. For example, in an actual FPGA more than one adjacent row of CLBs is typically included wherever the CLBs appear, to facilitate the efficient implementation of user logic.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for authentication. Other aspects and features will be apparent to those skilled in the art from consideration of the specification. The methods and system may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method of using a physically unclonable function (PUF) as a key-encrypting key, comprising:
   encrypting data using a session key;
   generating, from a PUF, a set of PUF values with a plurality of input challenges to the PUF, wherein the generating includes generating one or more PUF values of the set of PUF values under environmental conditions that are different from the environmental conditions under which one or more others of the set of PUF values are generated;
   encrypting the session key and a correctness indicator into a plurality of session key pairs using a plurality of PUF values of the set of PUF values as an encryption key, respectively; and
   adding the plurality of session key pairs to the encrypted data.

2. The method of claim 1, wherein the environmental conditions include one or more of a voltage level supplied to the PUF or an operating temperature of the PUF.

3. The method of claim 1, further comprising selecting, as the plurality of PUF values, n PUF values that occur most frequently in the set of PUF values.

4. The method of claim 1, further comprising:
   selecting, from the set of PUF values, one PUF value that occurs most frequently in the set of PUF values; and
   wherein the encrypting includes encrypting the session key and the correctness indicator into one session key of the plurality of session key pairs pair using the selected one PUF value.

5. The method of claim 1, further comprising:
   generating from the PUF, a first PUF value;
   for each session key pair accompanying the encrypted data, performing operations including:
      decrypting the session key pair into a decrypted session key and a decrypted correctness indicator using the first PUF value as a decryption key;
      in response to the decrypted correctness indicator being not equal to an expected correctness indicator:
         generating another PUF value; and
         decrypting the session key pair using the other PUF value as the decryption key; and
      in response to the decrypted correctness indicator being equal to the expected correctness indicator, decrypting the encrypted data using the decrypted session key.

6. A method of using a physically unclonable function (PUF) for decryption, comprising:
   generating from a PUF, a first PUF value under a first set of environmental conditions;
   for one or more data pairs in an input data set that includes a plurality of data pairs, each data pair including an encrypted first data part and an encrypted second data part, performing operations including:
      decrypting the data pair into a decrypted first data part and a decrypted second data part using the first PUF value as a decryption key;
      in response to the decrypted second data part being not equal to a correctness indicator:
         generating another PUF value under a second set of environmental conditions that is different from the first set of environmental conditions; and
         decrypting the data pair using the other PUF value as the decryption key; and
      in response to the decrypted second data part being equal to the correctness indicator outputting the decrypted first data part.

7. The method of claim 6, wherein:
   the generating of the first PUF value includes inputting a first challenge to the PUF; and
   the generating of the other PUF value includes inputting a second challenge to the PUF, wherein the second challenge is different from the first challenge.

8. The method of claim 6, wherein:
   the generating of the first PUF value includes inputting a first challenge to a first PUF; and
   the generating of the other PUF value includes inputting a second challenge to a second PUF, wherein the first PUF is different from the second PUF.

9. The method of claim 6, wherein:
   the input data set further includes encrypted payload data;
   the first data part is a session key; and
   the method further comprises, in response to the decrypted second data part being equal to the correctness indicator, decrypting the payload data using the decrypted session key.

10. A decryption system, comprising:
   at least one physically unclonable function (PUF), the PUF configured to output a PUF value in response to an input challenge;
   a decryption circuit, the decryption circuit configured to decrypt input data with an input decryption key; and
   a control circuit coupled to the PUF and to the decryption circuit, wherein the control circuit is configured to:
   input a data set that includes a plurality of data pairs, each data pair including an encrypted first data part and an encrypted second data part;
   for one or more of the data pairs:
      provide one or more challenges to the PUF and receive one or more corresponding PUF values;
      provide the one or more PUF values and the one or more input data pairs to the decryption circuit for decrypting the one or more input data pairs;
      determine whether or not a decrypted first data part is correct based on a decrypted second data part of one or more decrypted ones of the input data pairs; and
      in response to determining that the decrypted first data part is not correct, providing one or more different ones of the one or more PUF values and the one or more input data pairs to the decryption circuit for decrypting the one or more input data pairs; and
   in response to determining the decrypted first data part to be correct, outputting the decrypted first data part.

11. The system of claim 10, wherein:
the one or more challenges include a plurality of challenges; and
the control circuit is further configured to change environmental conditions of the PUF for each of the plurality of challenges.

12. The system of claim 11, wherein the environmental conditions include a supply voltage level to the PUF and an operating temperature of the PUF.

13. The system of claim 10, wherein:
the one or more challenges include a plurality of challenges; and
each challenge of the plurality of challenges is different from each other challenge of the plurality of challenges.

14. The system of claim 10, wherein:
the at least one PUF includes a plurality of PUFs coupled to the control circuit;
the one or more challenges include a plurality of challenges;
the control circuit is further configured to provide each challenge of the plurality of challenges to a different one of the PUFs.

15. The system of claim 14, wherein at least one of the plurality of PUFs is a ring-oscillator-based PUF, and another of the plurality of PUFs is a memory-based PUF.

* * * * *